N. PIGEON.
MANUFACTURE OF STARCH SUGAR.

No. 64,139. Patented Apr. 23, 1867.

UNITED STATES PATENT OFFICE.

NARCISSE PIGEON, OF MONTREAL, CANADA.

IMPROVEMENT IN THE MANUFACTURE OF STARCH-SUGAR.

Specification forming part of Letters Patent No. 64,139, dated April 23, 1867.

*To all whom it may concern:*

Be it known that I, NARCISSE PIGEON, of Montreal, Canada, have invented a new and useful Improvement in Manufacturing Starch-Sugar; and I do hereby declare that the following is a full, clear, and exact description thereof, which will enable others skilled in the art to make and use the same, reference being had to the accompanying drawings, forming part of this specification, in which—

Figure 1:
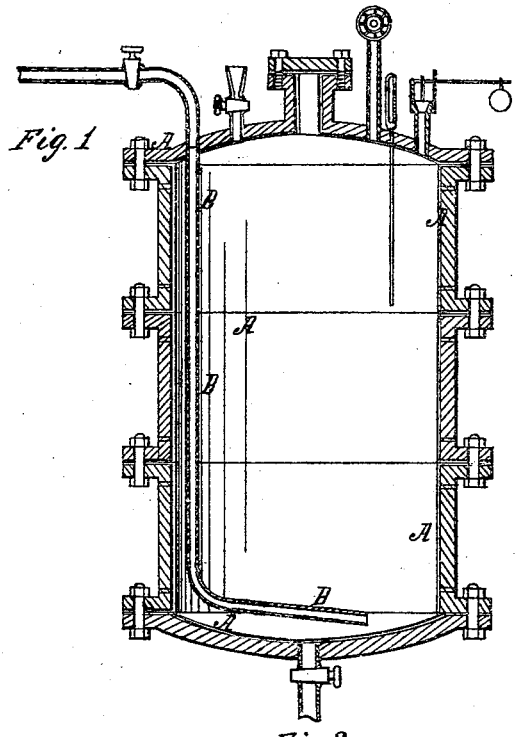
Figure 2:
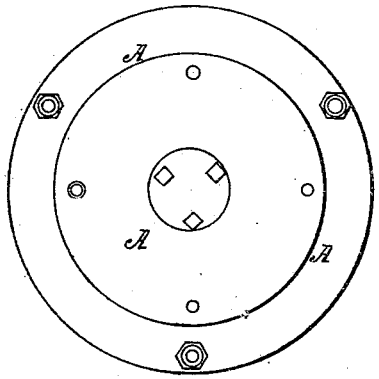

Figure 1 is a vertical section of the apparatus in which the heat and pressure are applied. Fig. 2 is a top view of the same.

Similar letters of reference indicate like parts.

My invention has for its object to furnish an improved mode of manufacturing a highly sweet sirup and hard crystallized sugar from Indian corn or any other substance that contains amylaceous matter; and it consists in the process of manufacturing the sirup and sugar, and in the apparatus in which the heat and pressure are applied.

The fecula is first extracted in the modern improved and well-known method, using, in steeping the grain, a solution of caustic soda. The purification of the fecula is effected by washing it upon inclined tables, as practiced in starch-factories. The gluten and lighter matter are carried off and let fall into a wooden vessel. The gluten, after being washed, may be used for making a cheap but nutritious bread. The fecula from the tables is washed several times with pure water. It is then treated with hydrochloric acid. About one per cent. is mixed with the amylaceous substance, which, if in a dry state, has been diluted in less than its own weight of water. After standing twenty-four hours the fecula is washed with pure water. It still contains fibrous or cellulose matter. The fecula is treated with hydrochloric acid to decompose the salts, oils, ozotized matter, &c., as being the best solvent. The starch thus treated is put into oblong boxes, where it is allowed to drain and to become nearly a solid mass.

A is a strong iron boiler or vessel made in three sections, each two feet high and five feet wide. It is convex at each end, and every part of its interior is lined with lead. Every cock, tube, &c., in communication with the inside of the apparatus, should be made of copper or brass.

B is a strong lead pipe, open at its lower end, and passing down through the apparatus and bent near its lower end, as shown in the drawing, to introduce the steam. The iron part or outside shell of the apparatus is perforated with small holes to allow the air to escape. A safety-valve, a steam-gage, and a sugar-pan thermometer should be attached to the upper end or head of the apparatus. About forty gallons of water are placed in the apparatus A and raised to a boiling-heat by means of steam. Two hundred pounds of the amylaceous substance are mixed with a little more than its own weight of water at a temperature of about 120° Fahrenheit, the water being previously acidulated with two pounds of sulphuric acid. This mixture is conveyed to the boiling water in the apparatus A in an uninterrupted stream, the whole being always kept up to the boiling-point. Two hundred pounds more are then prepared in the same way and sent in the same manner until a thousand pounds of the starch have been introduced, one per cent. of sulphuric acid being employed, or ten pounds of the acid to the thousand pounds of starch.

By my improved process I am able to do with less acid, and to produce a sirup superior in taste, color, and sweetness to the sirup produced in the old method.

As soon as the whole thousand pounds have been introduced into the apparatus A the said apparatus is hermetically closed, and its contents are gradually raised to three hundred degrees (300°) Fahrenheit, or above, and the pressure kept at from fifty to seventy pounds to the square inch for thirty minutes, more or less, according to the desired quality of the sugar, five minutes being sufficient for certain kinds of sugar.

The fecula is first converted into dextrine, and then totally, or nearly so, into sugar. The cellulose also is converted into sugar when the greatest heat and pressure are on the apparatus A.

Dextrine is an obstacle to crystallization, and ordinary pressure and boiling will not produce starch-sugar free from dextrine.

When the conversion of starch into sugar is completed, the steam is turned off, the liquor drawn into a wooden vessel, and the saturation proceeded with. About thirty pounds of whiting are first used, also about forty pounds of well-purified bone-dust, for the better settling of the liquor. The sweet and clear liquor, after standing twelve hours, more or less, or after being filtered, is evaporated in an ordinary evaporator, such as is used for evaporating cane-juice. The sediment from the sweet liquor is thrown into bag-filters, is drained, and afterward pressed. The liquor is concentrated to 20° or 22° Baumé, and allowed to stand for the precipitation of the sulphate of lime. The liquor is, when cooled, treated with a small quantity of pure hydrate of soda. The neutralization must be perfect, as any trace of acid impairs crystallization. The clear sirup may then be passed over animal charcoal, or may not, as may be thought necessary, and it is again concentrated to 33° Baumé on a serpentine evaporator, disk evaporator, or in a vacuum-pan, and is then fit for sale in a liquid state. To obtain it concrete or in an amorphous solid mass, it is evaporated to 45° hot. To make the starch-sirup into crystallizable sugar, it must contain no dextrine, or nearly so, must be defecated, filtered through bags and bone-black, must be free from sulphate of lime, and worked in the same manner as raw cane-sugar would be, with the exception of boiling it less in the vacuum-pan.

What I claim as new, and desire to secure by Letters Patent, is—

1. The within-described process of manufacturing a crystallizable sirup from fecula, free from dextrine, or nearly so, substantially as herein set forth.

2. The within-described process of manufacturing a hard crystallized sugar from starch-sirup prepared from fecula, as above described, substantially as herein set forth.

NARCISSE PIGEON.

Witnesses:
WM. I. McNAMARA,
JAMES T. GRAHAM.